United States Patent [19]

Liotine et al.

[11] Patent Number: 4,529,980

[45] Date of Patent: Jul. 16, 1985

[54] TRANSMITTER AND RECEIVER FOR CONTROLLING THE CODING IN A TRANSMITTER AND RECEIVER

[75] Inventors: Frank J. Liotine, Bartlett; Joseph W. Twardowski, Schaumburg, both of Ill.

[73] Assignee: Chamberlain Manufacturing Corporation, Elmhurst, Ill.

[21] Appl. No.: 422,451

[22] Filed: Sep. 23, 1982

[51] Int. Cl.$^3$ .......................... H04Q 9/00; H04B 7/00

[52] U.S. Cl. .......................... 340/825.52; 340/825.22; 340/696; 455/151

[58] Field of Search ...................... 340/825.52, 825.44, 340/825.31, 825.56, 825.22, 696; 455/88, 151, 186, 603, 607, 617

[56] References Cited

U.S. PATENT DOCUMENTS 3,911,397 10/1975 Freeny, Jr. .................... 340/825.31

4,081,747 3/1978 Meyerle .............................. 455/88

4,130,738 12/1978 Sandstedt ...................... 340/825.56

4,263,536 4/1981 Lee et al. ......................... 318/266

4,322,855 3/1982 Mogi et al. ......................... 455/151

4,328,540 5/1982 Matsuoka et al. ................. 364/167

4,422,071 12/1983 de Graaf ....................... 340/825.44

*Primary Examiner*—Donald J. Yusko

*Attorney, Agent, or Firm*—Hill, Van Santen, Steadman & Simpson

[57] ABSTRACT

Transmitters and receivers for controlling remote elements which use a synchronous serial transmission format and which allows changes in coding to be automatically made between the receiver and transmitter and wherein the code is stored in memories of the transmitter and receiver and wherein the receiver can generate and transmit a new code with a light emitting diode so as to change the code in the transmitter. The transmitter and the receiver use micro-computers which are suitably programmed and include non-volatile memories.

3 Claims, 12 Drawing Figures

NOTE 1. Pulse width of sync pulse determines sampling time interval starting from the leading edge of each pulse

TRANSMITTER AND RECEIVER FOR CONTROLLING THE CODING IN A TRANSMITTER AND RECEIVER

CROSS-REFERENCE TO RELATED APPLICATIONS

This application is related to co-pending application of Joseph W. Twardowski entitled "Transmitter and Receiver For Controlling Remote Elements" identified as Ser. No. 422,452 in the Attorney's records.

BACKGROUND OF THE INVENTION

1. Field of the Invention

This invention relates in general to a novel coding system for transmitters and receivers.

2. Description of the Prior Art

Remote control transmitters and receivers are known as, for example, for garage door openers and other devices. Initially, a different carrier frequency was utilized for each pair of transmitters and receivers so as to isolate them from other units. Also, various coding schemes have been utilized to encode data into digital form. Certain of such transmitters and receivers include a plurality of multi-position switches which control the coding for the transmitter and receiver and in such systems the codes can be changed by manually changing the positions of the switches to different positions and assuring that the position of the switches in the transmitter and receiver are the same.

SUMMARY OF THE INVENTION

The present invention comprises a novel multi-channel transmitter and receiver for controlling a plurality of functions and includes the feature of changing the code in the receiver and transmitter to one of a large number of codes in an automatic manner. A pulse length digital code is utilized.

When it is desired to change the identification code, a program mode switch is closed in the receiver and the micro-computer recalls from the non-volatile memory the last stored code. Using this code as a start, it performs a random number generation algorithm and stores the newly generated code in the non-volatile memory and immediately transmits the new code through a light emitting diode. The transmission format with the light emitting diode at the receiver continues until the program mode switch is turned off. During the energization of the light emitting diode in the receiver, the transmitter is placed in close proximity to the receiver so that it detects the code from the light emitting diode and the new code is then stored in the memory of the transmitter which then produces a flashing ready signal to indicate to the operator that the programming cycle has been completed. Although in this specification the code is shown as being generated in the receiver, it is to be realized that the code could also be generated in the transmitter and furnished to the receiver.

The novel transmitter and receiver can be used to remotely control a garage door, for example. Other applications are for security system where one or more transmitters monitor different areas which energize the receiver which actuates an alarm when the areas are invaded by intruders. Another application is for furnace control where one or more transmitters have temperature sensors and the transmitters are periodically keyed to transmit the temperature in a particular zone to the receiver which controls the furnace. The system of the invention can also be used to control electrical lights and appliances which are connected to the receiver. The invention can also be used to control television receivers and video tape recorders and in these applications sonic and/or infrared radiation may be used.

It is seen that the present invention provides an improved remote control system that can be used for a number of channels and allows for automatic change of the address coding between the transmitter and receiver.

Another object of the invention is to provide transmitters and receivers which have a large number of possible codes so as to eliminate interference between closely spaced transmitters and receiver systems.

Yet another object of the invention is to provide an improved transmitter and receiver system for a remote control device.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
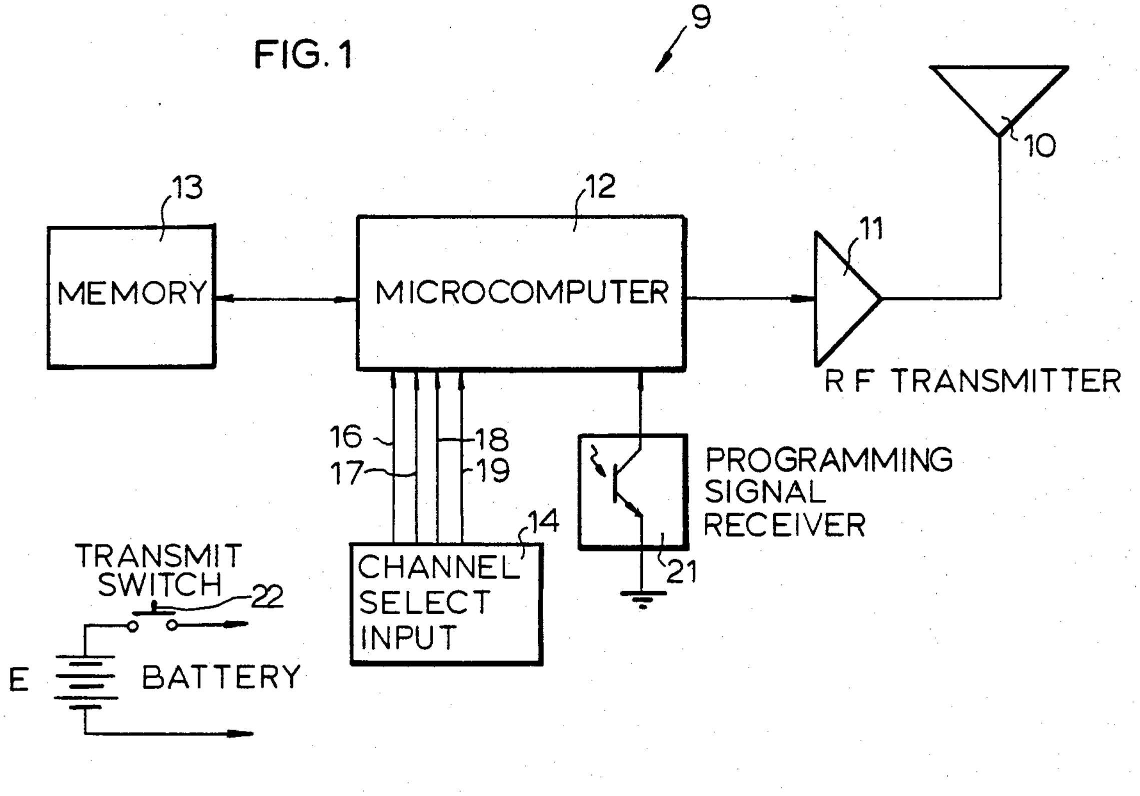
FIG. 1 comprises a block diagram of the transmitter.

FIG. 1 illustrates in block form the transmitter of the invention which comprises an antenna 10, an RF transmitter section 11 connected to the antenna and a micro-computer 12 supplying an input signal to the RF transmitter 11. The micro-computer is connected to a memory 13 which may be a non-volatile type memory and a number of channel select inputs 16, 17, 18 and 19 are connected to a channel selector unit 14 and supply inputs to the micro-computer 12. A power supply comprises a battery E and a transmit switch 22 such that when the transmit switch 22 is closed the transmitter is energized by applying power to the various units of the transmitter. A programming signal receiver 21 is connected to the micro-computer and provides means for selecting the code in the transmitter.

Figure 2:
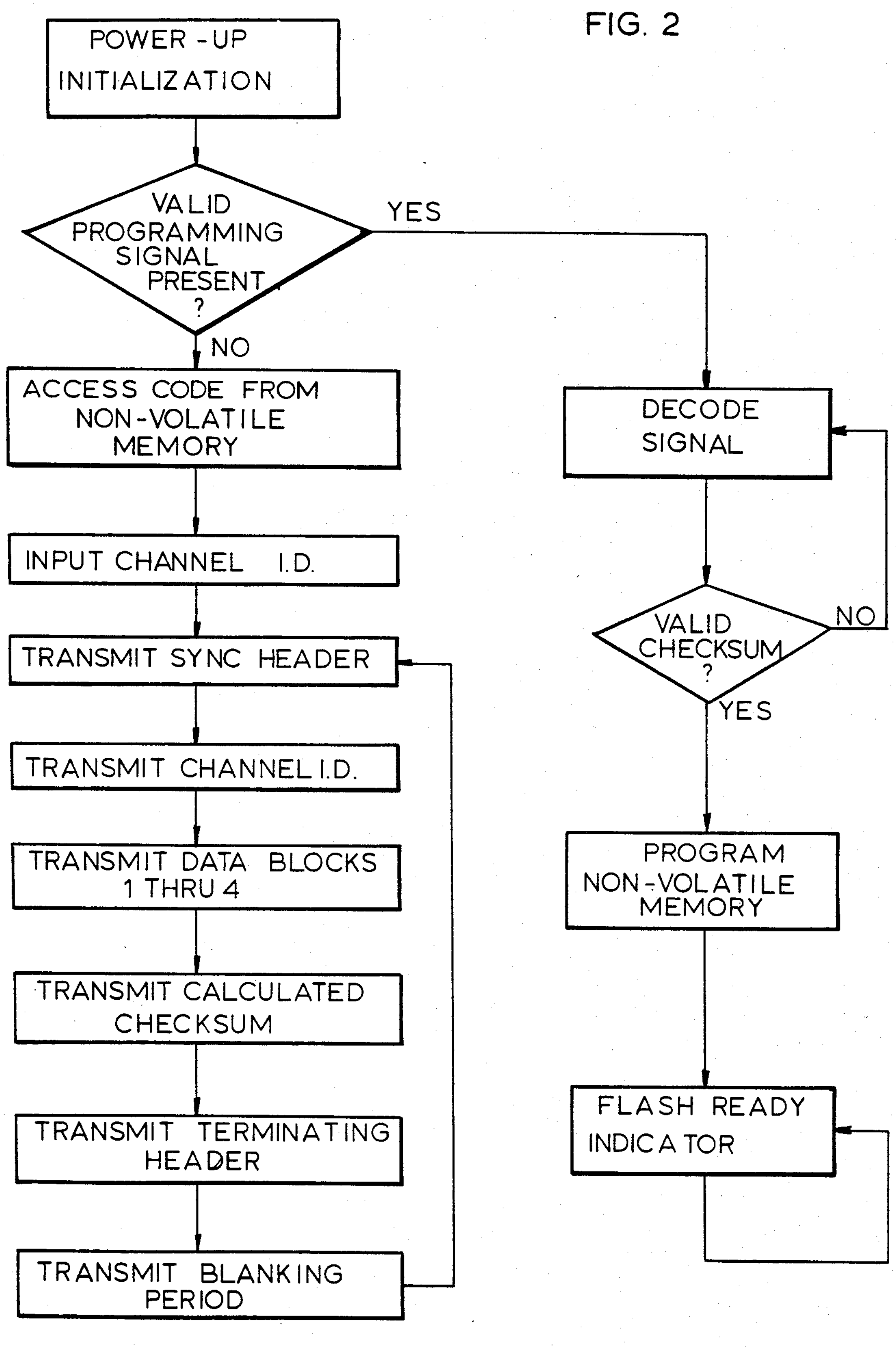
FIG. 2 comprises a flow chart for the transmitter.

FIG. 2 comprises the transmitter flow chart and when power is turned on the micro-computer 12 determines whether a valid programming signal is present.

Figure 3:
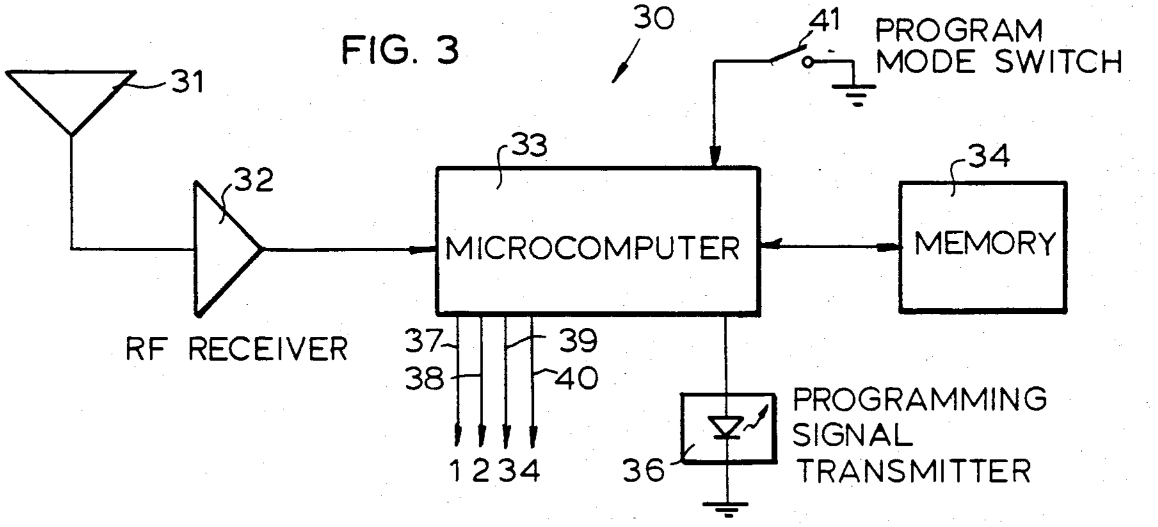
FIG. 3 comprises a block diagram for the receiver.

FIG. 3 is a block diagram of the receiver 30 which comprises an antenna 31 for receiving radiation from the transmitter 9. The receiver 30 includes an RF section 32 which is connected to the output of the antenna 31 and the RF receiver section 32 supplies an input to a micro-computer 33. A memory 34 such as a non-volatile type is connected to the micro-computer 33. A program mode switch 41 is connected to the micro-computer and output channel leads 37, 38, 39 and 40 supply operating signals for various apparatus or functions which are to be controlled as, for example, channel 1 might comprise a garage door opener. Channel 2 might comprise a security control channel. A programming signal transmitter 36 is connected to the micro-computer 33 for programming the transmitter 9.

Figures 4, 6A, 6B:
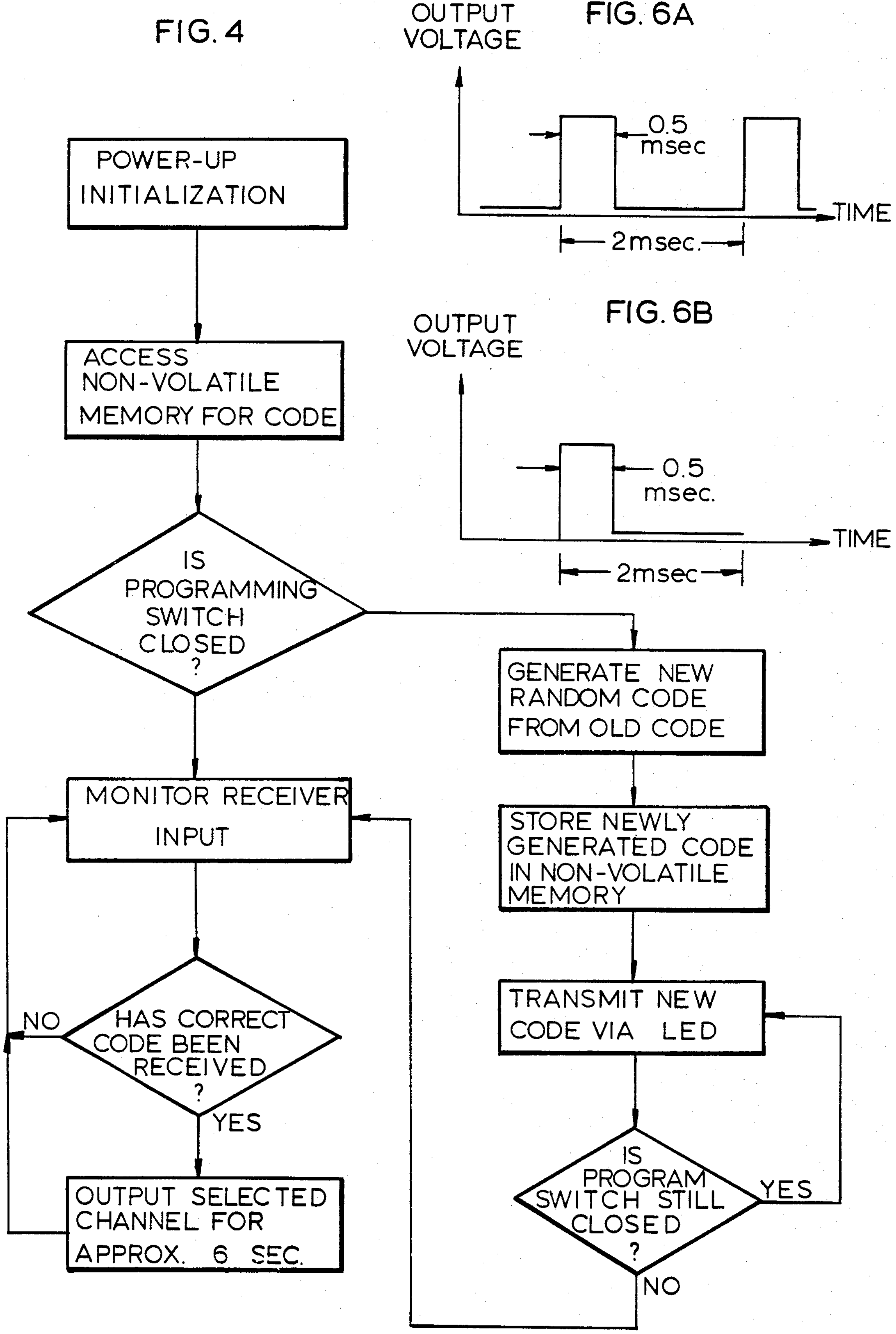
FIG. 4 comprises a flow chart for the receiver.
FIG. 6A illustrates a sync header waveform.
FIG. 6B illustrates a terminating header waveform.

FIG. 4 comprises a flow chart for the receiver.

The transmitter and receiver of the invention eliminate the dip switches for code selection which are required in prior art devices and allows the expansion of channels so that a number of channels can be utilized to control different functions. Faster response times are obtained than prior art control transmitters and receivers. A specific embodiment of the invention was constructed wherein a four-bit single chip micro-computer was utilized rather than custom discrete logic integrated circuit for performing the encoding and decoding of the algorithm. In addition, a non-volatile memory is used rather than a multiple three position switch for storing the custom code for each transmitter and receiver system.

The use of a single chip micro-computer rather than a discrete logic integrated circuit allows system flexibility for additional expansion and for various other radio controlled applications in addition to garage door opener systems without the requirement of major and exhaustive redesign efforts or custom integrated circuits. For such subsequent changes, a simple micro-program change in the self-contained mask ROM is all that is required and thus only software changes are necessary.

By using non-volatile memories rather than the dip switches used in the transmitters and receivers of the prior art devices requires that the randomly selected code be supplied from the receiver to the transmitter. Because of Federal Communication Commission rules and regulations, the transmission of radio frequency signals for this purpose cannot be used since the transmission of a coding signal for defining the code in the transmitter would not be within the Rules for actuating a garage door opener. This would comprise the transmission of a message containing information. This means that (1) during the programming mode transfer of code information from the receiver to the transmitter, the transmitter and receiver would have to be hard wired together or (2) the transfer of such data occurs by using infrared transmitters and receivers. The use of infrared transmitting and receiving means requires no physical contact between the systems.

In the present invention a synchronous serial transmission data format is utilized because (1) the equivalent replacement of the prior art nine pole three-position switch with a non-volatile memory requires that the electrical inputs be binary and (2) the present design allows additional channel expansion and identification.

In a particular embodiment constructed according to the invention, the maximum number of channels was selected to be sixteen and allow $2^{16}$ possible code combinations or 65,536.

Figure 5:
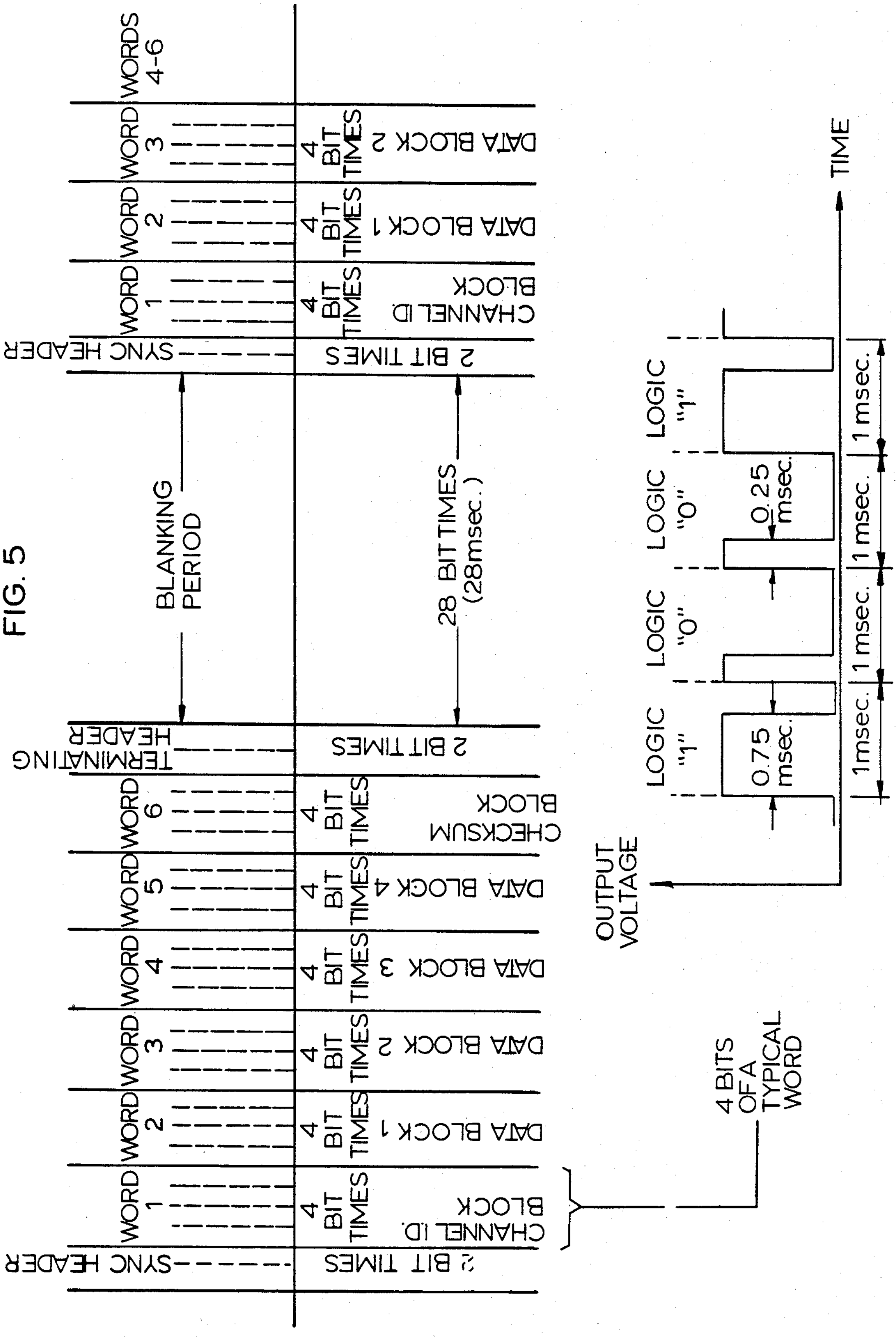
FIG. 5 illustrates a transmission signal format.

The transmission format used in the invention utilizes security and privacy and is binary and uses pulse position modulation as the decoding format for data transmission. FIGS. 5 and 6A and 6B illustrate the data format used. As shown in FIG. 5, a synchronization header frame of two bits is used for synchronization at the receiver. The first word 1 is a channel identification block of four-bits in length which contains the binary coded information that identifies the transmitting channel and this selection limits the maximum number of channels to sixteen.

Words 2 through 5 are data blocks and comprise four words each of four-bits containing binary coded information that can represent the code for a particular channel ($2^{16}$ possible code combinations or 65,536). Alternatively, other forms of digital information as, for example, the output of a transducer can be included in these words.

Word 6 is a checksum block and is an error checking format which is derived by the binary addition of the identification block with data blocks 1 through 4 and eliminates any carry bits. For example:

| BLOCK | MSB Bit 4 | Bit 3 | Bit 2 | LSB Bit 1 |
|---|---|---|---|---|
| Channel Identification Block | 0 | 1 | 1 | 0 |
| Data Block 1 | 1 | 1 | 0 | 1 |
| Data Block 2 | 1 | 0 | 0 | 1 |
| Data Block 3 | 1 | 1 | 1 | 0 |
| Data Block 4 | 1 | 1 | 0 | 1 |
| Checksum Block = binary sum of all blocks less any carry bits | 0 | 1 | 1 | 1 |

Then a termination header which is two-bits in length indicates to the receiver that the current information transmission train has terminated. Then there is a blanking period of 28 bits which in a specific embodiment comprises 28 msec and then the data format is repeated again.

An example of word 1 is shown in exploded form in FIG. 5 comprising four-bits of a typical word and a logic 1 comprises a pulse of 0.75 msec and a 0.25 period of no signal. A logic 0 comprises a signal of 0.25 and then no signal for 0.75 msec.

FIG. 3 illustrates the receiver block diagram and the software flow chart for the receiver is illustrated in FIG. 4. When the power is turned on, the receiver software first turns on the complete hardware system. It first interrogates the program mode switch input. If the program mode switch 41 is closed, the micro-computer 33 proceeds to access the non-volatile memory 34 to recall the last stored code. Using this code as a start, it then performs a random number generation algorithm and stores the newly generated code in the non-volatile memory and immediately transmits this new code through the light emitting diode 36. The transmitter 9 is placed in close proximity to the receiver 30 such that the programming signal receiver 21 receives the information from the light emitting diode 36. The transmission signal format of the receiver is as shown in FIG. 5 except that it does not need the channel identification block and uses a shorter blanking time equal to 5 msec. The receiver continues to transmit the code until the program mode switch 41 is opened after which the receiver monitors the receiver input port from the RF section and antenna.

Figure 9:
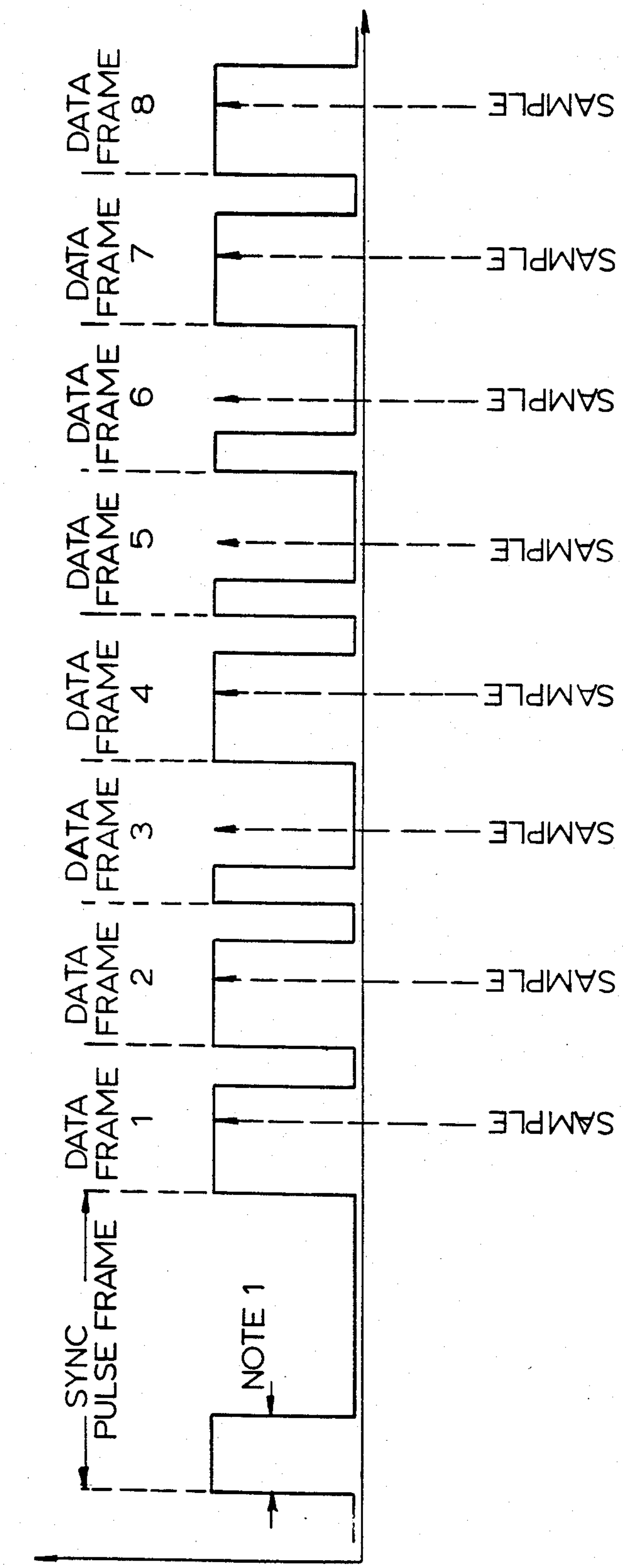
FIG. 9 illustrates a typical pulse train.

The receiver algorithm contains a software phase lock loop to lock it on the receiver sync header. All timing information required to perform the remainder of the algorithm is contained in the pulse width of the sync pulse. A software timing loop times out the pulse and stores this value in the memory. For each consecutive negative to positive transition, the micro-computer samples the input at the time interval it calculated from the sync pulse, as illustrated in FIG. 9. After all of the bits are sampled and stored in the memory, a comparison is made with the code stored in the non-volatile memory for a valid match. If a match is found, the appropriate channel output is identified by an appropriate light emitting diode to identify that particular channel.

FIG. 1 comprises a block diagram of the transmitter and FIG. 2 illustrates the software flow chart of the transmitter. The transmitter upon power up interrogates the input photo-transistor 21 for a period of about 10 msec for indication of a valid programming signal. If no programming signal is available within the first ten milliseconds, the transmitter software assumes that the presently stored code is accurate and the transmitter proceeds to transmit such code. It accesses the stored code from the non-volatile memory, reads the channel identification number, computes the checksum and then transmits all the information using the format illustrated and described.

If a programming signal is received, the transmitter decodes the incoming information and if the checksum is correct stores the new code in its non-volatile memory 13 and outputs a flashing ready signal to indicate that the programming cycle has been completed.

All output transmission timing is based on an ideal instruction execution time of 20 msec. Since the software is fixed, the only parameters that affect output timing are the resistor capacitor tolerances and any input tolerance variations between different micro-computers.

A software pseudorandom number generator is utilized at the receiver to generate the different codes.

The use of software to generate random values results in a paradox. The fact that an algorithm exists for a process implies that the process outputs are not truly random because the algorithm can be used to predict the output sequence. True random values can only be generated by the use of systems such as "memory garbage" or "human reaction time". The use of human reaction time requires additional hardware and expense which is undesirable in the high volume electronic industry. In the present invention, the use of "memory garbage" to start the system "initiation" or starting value is used on a one time basis.

In the algorithm used every time a random number is required a new sixteen bit configuration will result from the seed or initiation value used. Continuous recall for sufficient number of times will result in all the possible sixteen bit configurations. However, the outputs will appear random if the sequence of outputs are considered and it is impossible to prove that the program is not producing true random numbers. The distribution of outputs is uniform over the range of possible outputs although all possible sixteen bit values appear before any repetition occurs. In the present invention 65,536 outputs will occur before any repetition occurs.

The algorithm used words as follows. The random code is stored in four blocks of memory each four-bits wide for a sixteen bit word. This allows a binary representation of 65,536 discrete numbers. However, for the random number generator algorithm to work, the all zero state must not be used therefore there are only 65,535 numbers that can be used.

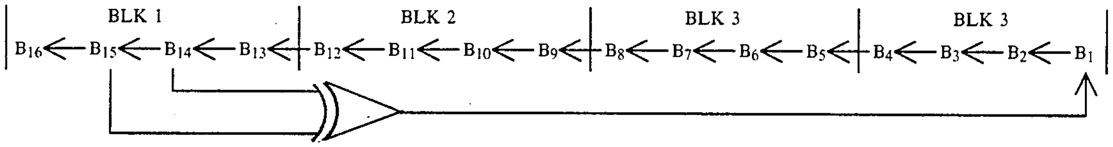

Whenever the program calls for random number, the previous value or "seed" is recalled. Each bit is shifted left one position. Bits 14 and 15 are exclusive or-ed and the result is shifted into the first position of block 4. In this manner, all possible 65,535 combinations will result before the pattern repeats.

The program for the transmitter micro-processor 12 and the program for the receiver micro-processor 33 are attached.

Figure 7A:
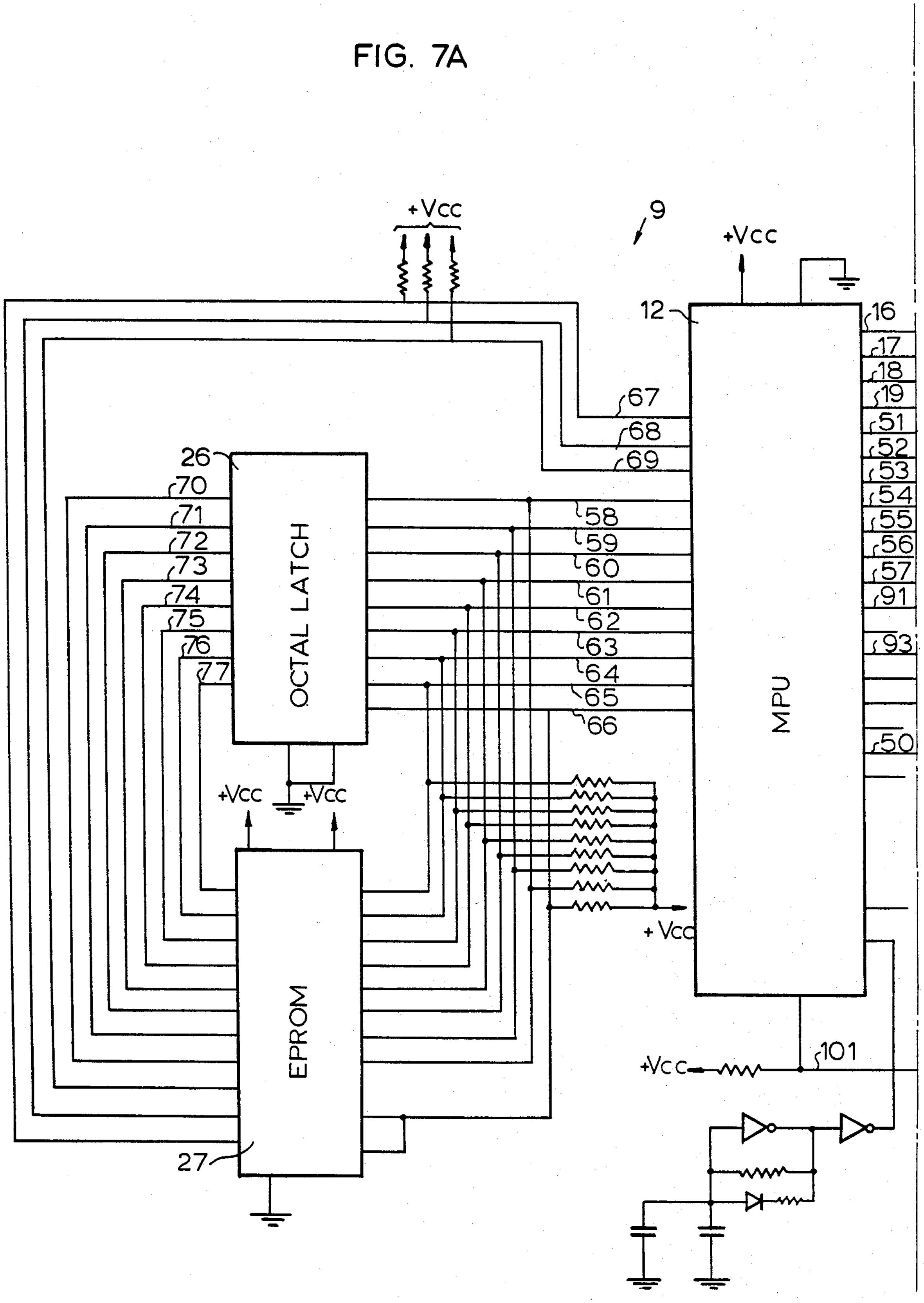
FIGS. 7A and 7B comprise a schematic diagram of the transmitter.
Figure 7B:
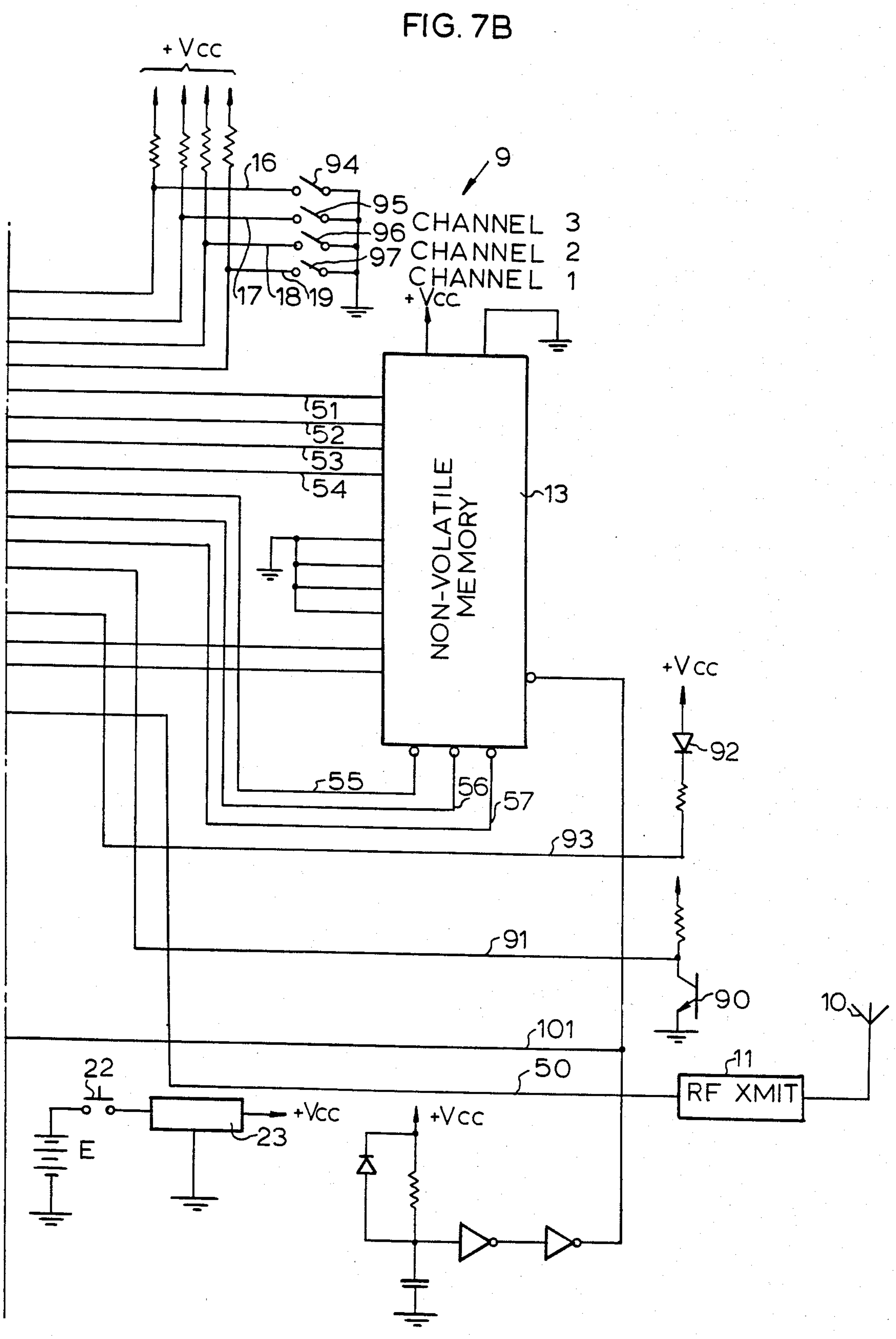

FIGS. 7A and 7B illustrate the electrical schematic of the transmitter 9, the antenna 10 is connected to the RF transmitter 11 which receives an output on lead 50 from output terminal SO of the micro-computer 12. The micro-computer 12 may be a National type 404LP, for example. The non-volatile memory 13 may be a XICOR type X-2210 and is connected by leads 51 through 57 to the micro-processor 12 as illustrated. An octal latch 26 is connected to the micro-computer 12 by leads 58 through 66 and might be a type 74C373. A EPROM 27 might be a type 2716 available from INTEL and is connected by leads 58 through 69 to the micro-computer 12 and is further connected to the octal latch 26 by leads 70 through 77. The power supply E and transmit switch 22 are connected to a regulator 23 which produces the drive voltage +Vcc. Infrared sensor 90 is connected by lead 91 to the micro-computer 12. A ready indicator 92 is connected by lead 93 to the micro-computer 12. Channel selector switches 94 through 97 are connected to channel selector leads 16, 17, 18 and 19 which are connected to the micro-computer 12. A lead 101 is connected from the memory 13 to the reset terminal of the micro-computer 12.

Figure 8A:
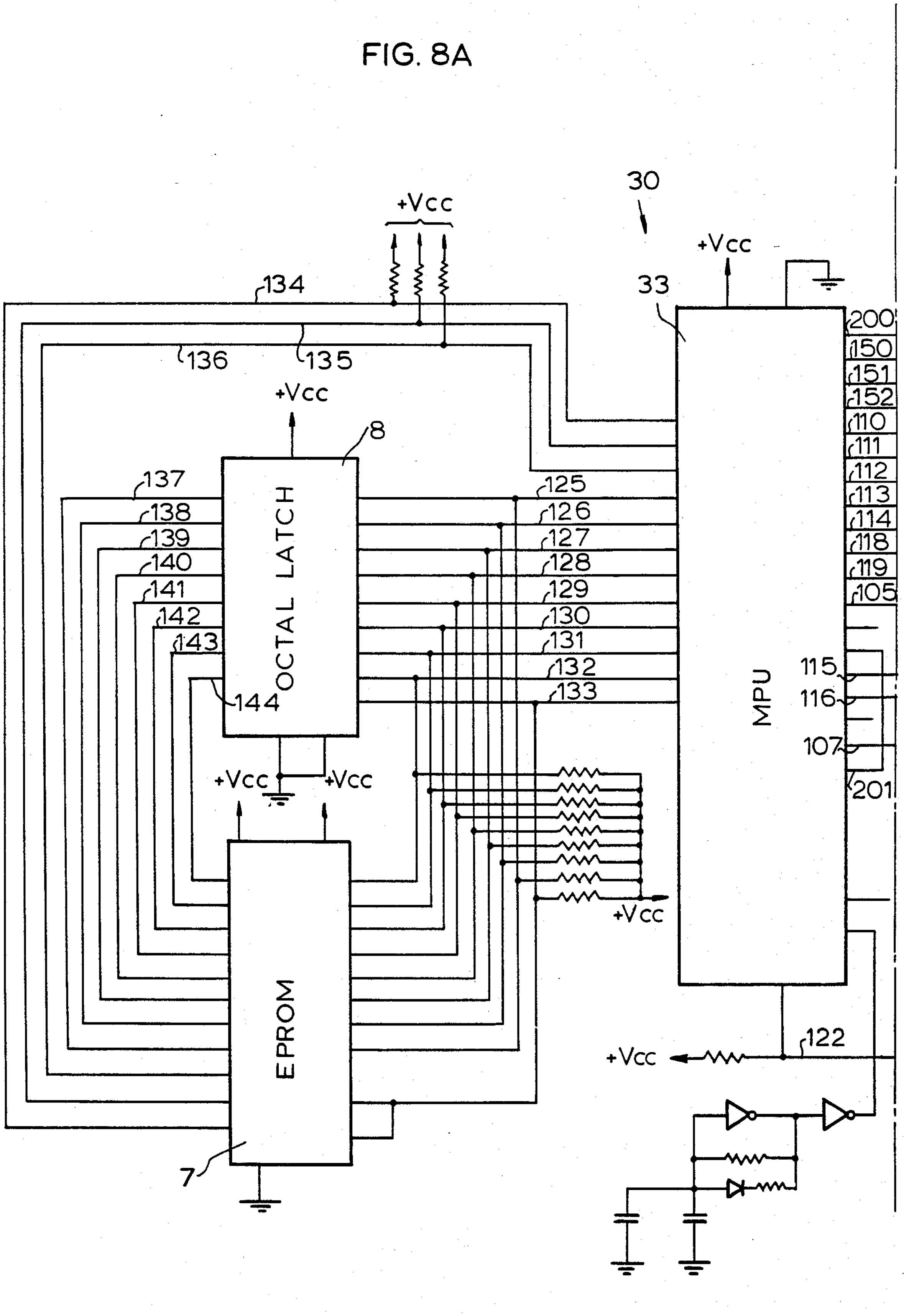
FIGS. 8A and 8B comprise a schematic diagram of the receiver.
Figure 8B:
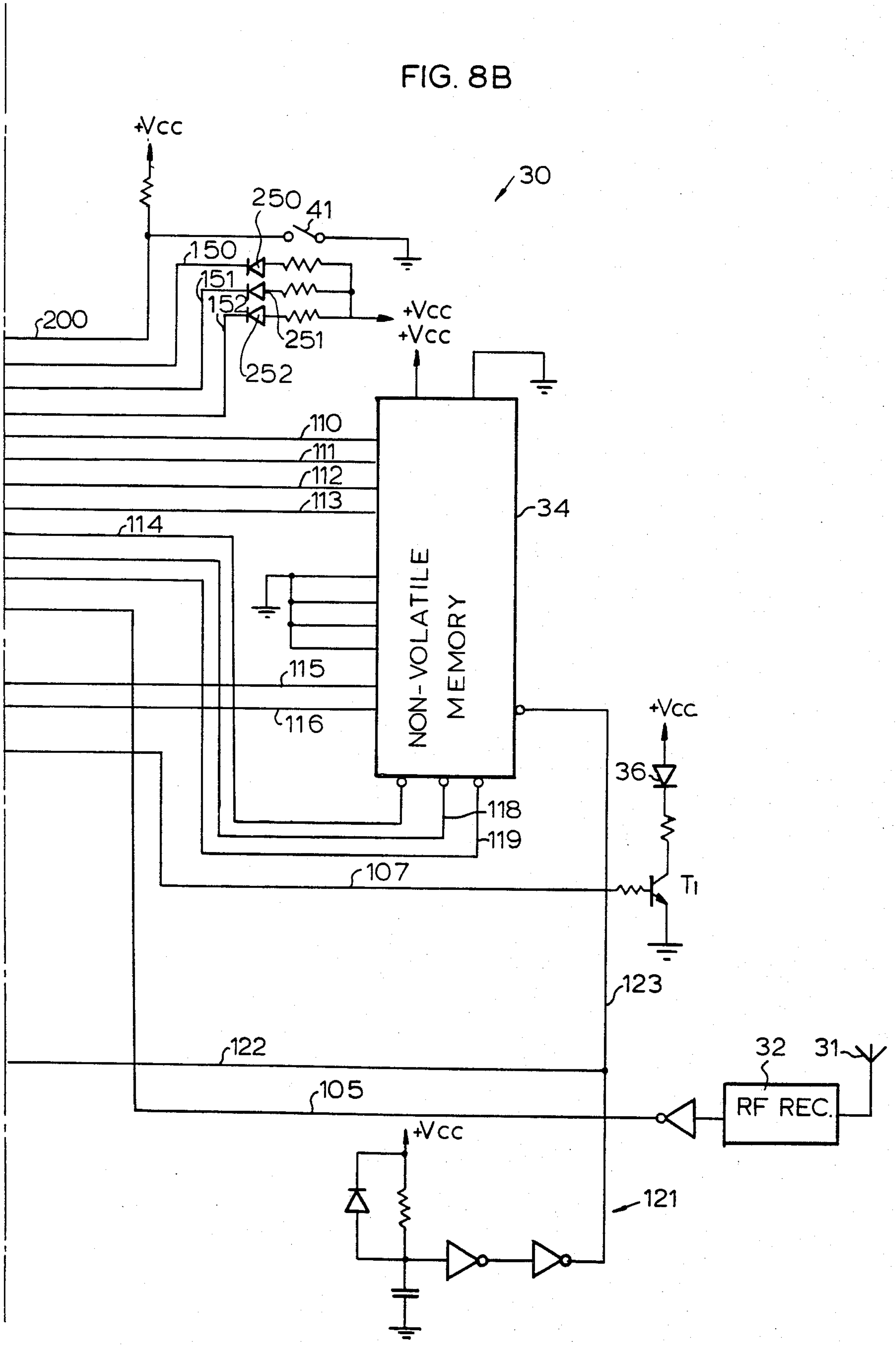

FIG. 8 illustrates the receiver in schematic form. The micro-computer 33 may be a type 404LP available from National Corporation. The antenna 31 is connected to the RF receiver 32 and by lead 105 to the micro-computer 33. The programming LED 36 is connected through a resistor and a transistor T1 to lead 107 which is connected to the micro-computer 33. A non-volatile memory 34 which might be a type X2210 available from XICOR is connected by leads 110 through 119 to the micro-computer 33. A reset circuit 121 is connected by leads 122 and 123 to the reset of the micro-computer 33 and the memory 34. An octal latch 8 which might be type 74C373 is connected by leads 125 through 133 to the micro-computer 33. An EPROM 7 which may be a type 2715 is connected to the octal latch 8 and to the computer 33 by leads 125 through 136. The EPROM 7 and octal latch 8 are connected together by leads 137 through 144. The program switch 41 is connected to the micro-computer 33 by lead 200. The channel indicator lights 250, 251 and 252 are connected to the micro-computer by leads 150, 151 and 152 and illustrate which channel is energized.

Another modification for changing and encoding the code in the transmitter and receiver comprises instead of using the signal transmitter 36 in the receiver and the signal receiver 21 in the transmitter is to provide that transmitter and receiver be electrically connected together. For example, in the receiver 30 an electrical plug could be mounted in place of the signal transmitter 36 and a mating plug could be installed in the transmitter 9 in place of the signal receiver 21 and when the plugs are joined the code can be furnished by the receiver 30 to the transmitter 9 when the program mode switch 41 is closed. After the code has been transmitted and stored the transmitter can be unplugged from the receiver and the system operated with the new code.

Although the invention has been described with respect to preferred embodiments, it is not to be so limited as changes and modifications can be made which are within the full intended scope of the invention as defined by the appended claims.

We claim as our invention:

1. Apparatus for controlling a radio frequency receiver with a remote radio frequency transmitter comprising a first memory means in said receiver for storing at least one address code, infrared transmitting means in said receiver, a first microcomputer in said receiver capable of accessing said first memory means and for generating a random address code and storing it in said first memory means, a program mode switch means in said radio frequency receiver for energizing said first microcomputer to generate said random access address code and for energizing said infrared transmitting means to transmit said address code, an infrared receiving means in said transmitter for receiving said address code, a second memory means in said transmitter for storing said address code, radio frequency radiating means in said transmitter for radiating said address code, radio frequency receiving means in said receiver for receiving said transmitted code, said first microcomputer in said receiver receiving and comparing the received address code with the address code stored in said first memory, and an output circuit energized by said first computer when said addresses are the same.

2. Apparatus according to claim 1 wherein when said program mode switch means is closed in said receiver said first microcomputer accesses said first memory means and recalls the address stored therein and uses such address as a start to generate said new random access address code.

3. Apparatus according to claim 1 including a second microcomputer in said transmitter connected to said infrared receiving means and said second memory means.

* * * * *